US009969342B2

(12) United States Patent
Klop et al.

(10) Patent No.: US 9,969,342 B2
(45) Date of Patent: May 15, 2018

(54) BODY-ON-FRAME BUMPER STEP PAD WITH SEAL BETWEEN BUMPER BEAM AND RADIATOR GRILL

(71) Applicant: FORD GLOBAL TECHNOLOGIES, LLC, Dearborn, MI (US)

(72) Inventors: Aaron Peter Klop, Bloomfield Hills, MI (US); Joseph Andrew Hickey, Rochester, MI (US); Jodi Ann McGrew, Grosse Ile, MI (US); David Brian Glickman, Southfield, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days. days.

(21) Appl. No.: 14/669,073

(22) Filed: Mar. 26, 2015

(65) Prior Publication Data

US 2016/0280168 A1    Sep. 29, 2016

(51) Int. Cl.
*B60R 19/02* (2006.01)
*B60R 3/00* (2006.01)
(Continued)

(52) U.S. Cl.
CPC .......... *B60R 19/52* (2013.01); *B60R 3/00* (2013.01); *B60R 13/06* (2013.01); *B60R 19/48* (2013.01); *B60K 11/085* (2013.01); *B60R 2019/486* (2013.01); *B60Y 2200/14* (2013.01); *Y02T 10/88* (2013.01)

(58) Field of Classification Search
CPC ...... B62D 25/084; B60K 11/04; B60K 11/08; B60K 11/085; B60R 19/52
See application file for complete search history.

(56) References Cited

U.S. PATENT DOCUMENTS 2,329,874 A * 9/1943 Cadwallader ............. B60J 9/02
                                                            180/68.1
3,884,516 A * 5/1975 Gallion .................... B60R 19/18
                                                            293/117
(Continued)

FOREIGN PATENT DOCUMENTS

CN       103625269 A      3/2014
CN       203600991 U      5/2014
(Continued)

OTHER PUBLICATIONS

2011 F250 Front end assembly parts diagram obtained from http://www.oemfordpart.com/auto-parts/2011/ford/f-250-super-duty/king-ranch-trim/6-7l-v8-diesel-engine/body-cat/bumper-and-components-front-scat on Jan. 7, 2017.*
(Continued)

*Primary Examiner* — Joseph M Rocca
*Assistant Examiner* — Vaughn Coolman
(74) *Attorney, Agent, or Firm* — Jason Rogers; King & Schickli, PLLC

(57) ABSTRACT

A front bumper step for a vehicle includes a step portion and a gap seal configured to prevent a flow of air through a gap defined between a front bumper fascia of the vehicle and a front grille assembly of the vehicle. The gap seal may be provided as an integral unit with a step pad portion of the front bumper step portion. The vehicle may include an active grille shutter system, and the front grille assembly may be an upper grille assembly. The gap seal may be fabricated of a flexible material.

16 Claims, 4 Drawing Sheets

(51) Int. Cl.
*B60R 19/52* (2006.01)
*B60R 19/48* (2006.01)
*B60R 13/06* (2006.01)
*B60K 11/08* (2006.01)

(56) References Cited

U.S. PATENT DOCUMENTS

| | | | | |
|---|---|---|---|---|
| 4,098,531 A * | 7/1978 | Renner | B60R 19/26 | 293/102 |
| 4,410,032 A * | 10/1983 | Mori | B60K 11/085 | 123/41.06 |
| 4,566,407 A * | 1/1986 | Peter | B60K 11/08 | 123/41.48 |
| 4,938,303 A * | 7/1990 | Schaal | B60H 1/3227 | 123/41.48 |
| 5,205,484 A * | 4/1993 | Susa | B60H 1/3227 | 123/41.04 |
| 5,478,127 A * | 12/1995 | Chase | B60K 11/08 | 180/68.6 |
| 6,012,761 A * | 1/2000 | Hellhake | B60K 11/08 | 293/115 |
| 6,041,878 A * | 3/2000 | Daniels | B60K 11/08 | 180/68.6 |
| 6,230,832 B1 * | 5/2001 | von Mayenburg | B60K 11/08 | 180/68.1 |
| 6,302,228 B1 * | 10/2001 | Cottereau | B60K 11/08 | 180/68.1 |
| 6,390,217 B1 * | 5/2002 | O'Brien | B60K 11/04 | 160/DIG. 1 |
| 6,405,819 B1 * | 6/2002 | Ohkura | B60K 11/08 | 180/68.1 |
| 6,508,506 B2 * | 1/2003 | Ozawa | B60K 11/04 | 293/113 |
| 6,527,333 B2 * | 3/2003 | Hewitt | B62D 35/00 | 180/68.6 |
| 6,676,179 B2 * | 1/2004 | Sato | B60R 21/34 | 293/115 |
| 6,997,490 B2 * | 2/2006 | Evans | B60R 19/18 | 293/104 |
| 7,059,031 B1 * | 6/2006 | Elwell | B60R 13/00 | 180/68.6 |
| 7,114,587 B2 * | 10/2006 | Mori | B60K 11/04 | 180/68.3 |
| 7,410,018 B2 * | 8/2008 | Satou | B60R 19/12 | 180/68.4 |
| 7,438,348 B2 * | 10/2008 | Nakamae | B62D 21/152 | 180/68.6 |
| 7,455,351 B2 * | 11/2008 | Nakayama | B60R 19/52 | 180/68.6 |
| 7,461,875 B2 * | 12/2008 | Kobayashi | B29C 45/0081 | 293/115 |
| 7,481,487 B2 * | 1/2009 | Lau | B60R 19/52 | 180/68.1 |
| 7,517,006 B2 * | 4/2009 | Kageyama | B60R 21/34 | 296/187.09 |
| 7,523,798 B2 * | 4/2009 | Muramatsu | B60K 11/08 | 180/68.1 |
| 7,527,308 B2 * | 5/2009 | Buniewicz | B60R 19/04 | 280/164.1 |
| 7,766,111 B2 * | 8/2010 | Guilfoyle | B60K 11/04 | 180/68.1 |
| 7,950,730 B2 * | 5/2011 | Usoro | B60R 19/52 | 296/193.1 |
| 7,988,225 B2 * | 8/2011 | Goldsberry | B60R 19/18 | 293/133 |
| 8,100,209 B2 * | 1/2012 | Goldsberry | B60K 13/02 | 180/68.1 |
| 8,128,158 B1 * | 3/2012 | Davis | B60K 11/08 | 181/224 |
| 8,181,727 B2 * | 5/2012 | Ritz | B60K 11/085 | 180/68.1 |
| 8,267,209 B2 * | 9/2012 | Kuwabara | B60K 11/04 | 123/41.48 |
| 8,302,714 B2 * | 11/2012 | Charnesky | B60K 11/085 | 180/68.1 |
| 8,356,856 B2 * | 1/2013 | Danev | B62D 35/005 | 296/180.1 |
| 8,371,407 B2 * | 2/2013 | Hassdenteufel | B62D 25/084 | 165/149 |
| 8,434,579 B2 * | 5/2013 | Widmer | B62D 25/084 | 180/68.1 |
| 8,485,295 B2 * | 7/2013 | Mildner | B62D 25/084 | 180/68.1 |
| 8,517,130 B2 * | 8/2013 | Sakai | B60K 11/085 | 180/68.1 |
| 8,708,075 B2 * | 4/2014 | Maurer | B60K 11/08 | 180/68.1 |
| 8,746,386 B2 * | 6/2014 | Atkinson | B60R 19/48 | 123/41.7 |
| 8,752,886 B2 * | 6/2014 | Wirth | B60K 11/085 | 180/68.6 |
| 8,919,864 B2 * | 12/2014 | Kojima | B60K 11/085 | 180/68.1 |
| 8,936,121 B2 * | 1/2015 | Vacca | B60K 11/04 | 165/44 |
| 8,998,293 B2 * | 4/2015 | Glickman | B60K 11/08 | 180/68.1 |
| 9,016,772 B2 * | 4/2015 | Townson | B62D 25/085 | 296/193.1 |
| 9,061,585 B2 * | 6/2015 | Fujiu | B60K 11/08 | |
| 9,162,641 B2 * | 10/2015 | Townson | B62D 25/084 | 180/68.6 |
| 9,233,605 B2 * | 1/2016 | Hijikata | B60K 11/085 | |
| 9,333,849 B2 * | 5/2016 | Kabbes | B60K 11/08 | |
| 2001/0026082 A1 * | 10/2001 | Ozawa | B60K 11/04 | 296/193.09 |
| 2002/0129981 A1 * | 9/2002 | Satou | B60R 19/12 | 180/68.6 |
| 2006/0102109 A1 * | 5/2006 | Becker | B60K 11/08 | 123/41.48 |
| 2006/0108813 A1 * | 5/2006 | Goebert | B62D 25/10 | 293/115 |
| 2007/0119395 A1 * | 5/2007 | Nagano | F01P 11/10 | 123/41.65 |
| 2009/0050385 A1 * | 2/2009 | Guilfoyle | B60K 11/04 | 180/68.1 |
| 2009/0261601 A1 * | 10/2009 | Shin | B62D 25/084 | 293/115 |
| 2010/0243351 A1 * | 9/2010 | Sakai | B60K 11/085 | 180/68.1 |
| 2012/0019025 A1 * | 1/2012 | Evans | B60K 11/085 | 296/193.1 |
| 2012/0022742 A1 * | 1/2012 | Nemoto | B60K 11/085 | 701/36 |
| 2012/0090906 A1 * | 4/2012 | Charnesky | B60K 11/085 | 180/68.1 |
| 2012/0193156 A1 * | 8/2012 | Hirano | B60K 11/08 | 180/68.1 |
| 2012/0312611 A1 * | 12/2012 | Van Buren | B60K 11/085 | 180/68.1 |
| 2012/0325324 A1 * | 12/2012 | Widmer | B62D 25/084 | 137/1 |
| 2013/0069389 A1 * | 3/2013 | Meeks | B62D 35/005 | 296/180.1 |
| 2013/0223980 A1 * | 8/2013 | Pastrick | F01D 5/00 | 415/1 |
| 2013/0268164 A1 * | 10/2013 | Sugiyama | B60K 11/085 | 701/49 |
| 2014/0090911 A1 * | 4/2014 | Oota | B60K 11/085 | 180/68.1 |
| 2014/0132033 A1 * | 5/2014 | Townson | B62D 25/084 | 296/193.1 |
| 2014/0132035 A1 * | 5/2014 | Townson | B62D 25/085 | 296/193.1 |

(56) References Cited

U.S. PATENT DOCUMENTS

2014/0290599 A1* 10/2014 Numata ............... F01P 7/10
                                                    123/41.05
2016/0264085 A1*  9/2016 Tomita ............... B60R 19/48

FOREIGN PATENT DOCUMENTS

| KR | 20110063116 A | 10/2011 |
| KR | 20130007827 A | 1/2013 |
| KR | 20130022482 A | 3/2013 |

OTHER PUBLICATIONS

Text and images from website "https://www.carid.com/2011-ford-f-250-bumpers/replace-front-step-bumper-pad-141617514.html?parentsubmodel[]=SUBMODEL|King Ranch" retrieved on Aug. 6, 2017.*

Photo from website "http://exoticsalvage.com/13-ford-f350-f250-trim-exterior-upper-bumper-step-pad-bc34-17c881-db901446" showing 2013 Ford F250 bumper step pad retrieved on Aug. 6, 2017.*

Image from website "https://www.oemfordpart.com/auto-parts/2011/ford/f-250-super-duty/king-ranch-trim/6-2l-v8-flex-engine/body-cat/bumper-and-components-front-scat" retrieved on Aug. 6, 2017.*

Text and images from website "https://www.oemfordpart.com/auto-parts/2011/ford/f-250-super-duty/king-ranch-trim/6-2l-v8-flex-engine/body-cat/bumper-and-components-front-scat" retrieved on Aug. 6, 2017.*

English machine translation for 103625269CN.
English machine translation for 203600991CN.
English machine translation for 20110063116KR.
English machine translation for 20130007827KR.
English machine translation for 20130022482KR.

* cited by examiner

BODY-ON-FRAME BUMPER STEP PAD WITH SEAL BETWEEN BUMPER BEAM AND RADIATOR GRILL

TECHNICAL FIELD

This disclosure relates generally to bumper steps for a motor vehicle. More particularly, the disclosure relates to a front bumper step for a vehicle, including a seal preventing airflow between a bumper beam and a radiator grille.

BACKGROUND

In conventional grille systems, airflow through the grille assembly to motor vehicle components is substantially unimpeded. Advantageously, particularly at highway speeds this provides a source of cooling air to vehicle components such as the motor, radiator, etc. However, when the vehicle engine and cooling system are not operating at high capacity and so require less additional cooling, such unimpeded airflow is unnecessary. Moreover, such airflow is known to increase aerodynamic drag of the vehicle, lessening fuel economy.

For that reason, it is known to provide grille shutter systems for motor vehicles to lessen aerodynamic drag and so improve fuel economy. Such grille shutter systems include a series of vanes which may be opened or closed to increase or decrease airflow as needed. When increased airflow is required such as for cooling purposes, the vanes may be partially or fully opened to increase airflow through the vehicle radiator and into the engine compartment. When less airflow is required, for example when the motor and/or radiator are not operating at a high capacity and so requires less cooling, the vanes may be partially or fully closed to lessen airflow into the engine compartment. When the grille shutter system is closed, aerodynamic drag is reduced, improving aerodynamic properties of the vehicle and so improving fuel economy. A further advantage is that a vehicle operating with a closed grille shutter system requires less warm-up time in cold weather. As one example, active grille shutter systems are known in the art, which include vanes that open and close automatically to control airflow as needed.

It is likewise known to provide a front bumper step in a variety of motor vehicles, particularly tall vehicles such as trucks. The front bumper step provides convenience to the vehicle user, for example when there is a need to access the interior of the engine compartment.

Industry standards require a 15 mm to 21 mm design gap between a frame-mounted bumper and other elements of the vehicle body, such as the vehicle radiator frame-mount/radiator grille. However, particularly in vehicles equipped with front grille shutter systems, it has been found that even when the grille shutter system is in the closed configuration, this design gap provides an airflow leak that can increase aerodynamic drag and concomitantly decrease fuel economy, due to the redirection of airflow through the gap. Accordingly, a need in the art exists for designs which eliminate this increased drag in vehicles with grille shutter systems.

SUMMARY

In accordance with the purposes and benefits described herein, in one aspect a front bumper step for a vehicle includes a step portion and a gap seal configured to prevent a flow of air through a gap defined between a front bumper fascia of the vehicle and a front grille assembly of the vehicle. In embodiments, the gap seal may be provided as a separate element from or as an integral unit with a step pad portion of the front bumper step portion. In other embodiments, the vehicle may include an active grille shutter system, and the front grille assembly may be an upper grille assembly. In still other embodiments, the gap seal may be fabricated of a flexible material.

In another aspect, a front bumper and grille assembly for a vehicle is provided, including the gap seal as described above.

In yet another aspect, a front bumper step pad is provided, including the gap seal as described above.

In the following description, there are shown and described several preferred embodiments of the described front bumper gap seal. As it should be realized, the device is capable of other, different embodiments and its several details are capable of modification in various, obvious aspects all without departing from the front bumper gap seal as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the front bumper gap seal and together with the description serve to explain certain principles thereof. In the drawing figures.

Reference will now be made in detail to the present preferred embodiments of the front bumper gap seal of the disclosure, examples of which are illustrated in the accompanying drawing figures.

DETAILED DESCRIPTION

Figure 1:
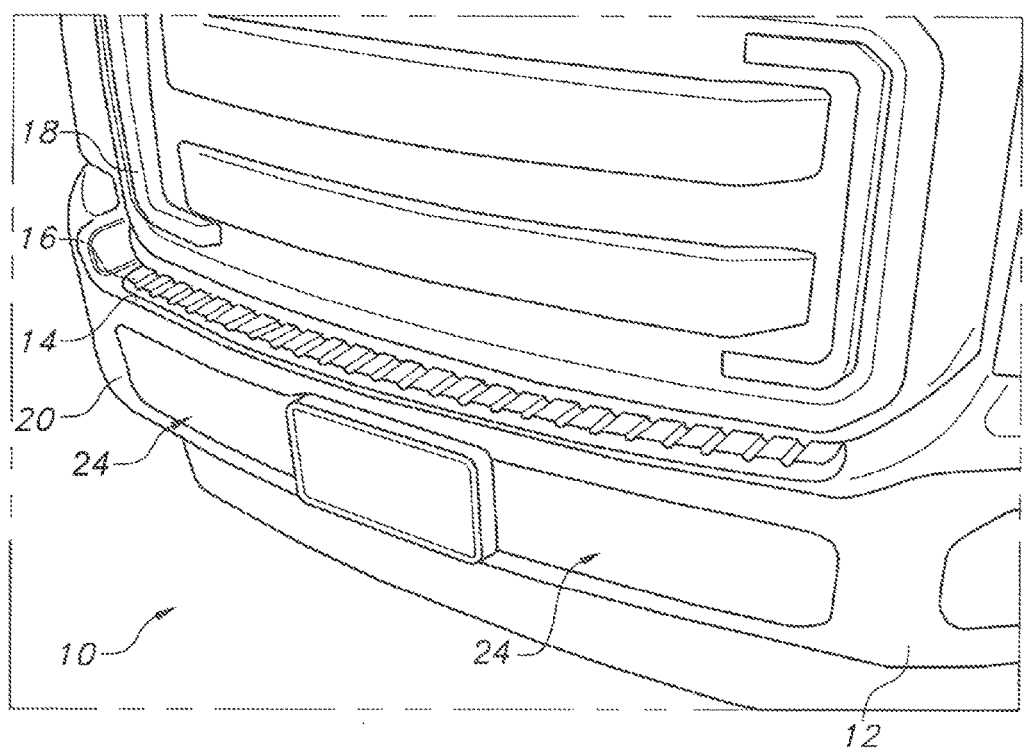
FIG. 1 depicts a front view of a motor vehicle including a front bumper step and step pad.

Reference is now made to FIG. 1 illustrating a front portion of a vehicle 10, and in particular a front bumper fascia 12 having thereon a bumper step 14. A bumper step pad 16 is provided, typically fabricated of a suitably slip-resistant material on which a user steps to, for example, more conveniently access the vehicle engine compartment. As depicted, the vehicle further includes a grille assembly including an upper grille portion 18 and a lower grille portion 20. Airflow is provided via apertures 22 in the upper grille portion and apertures 24 in the bumper fascia.

Figure 2:
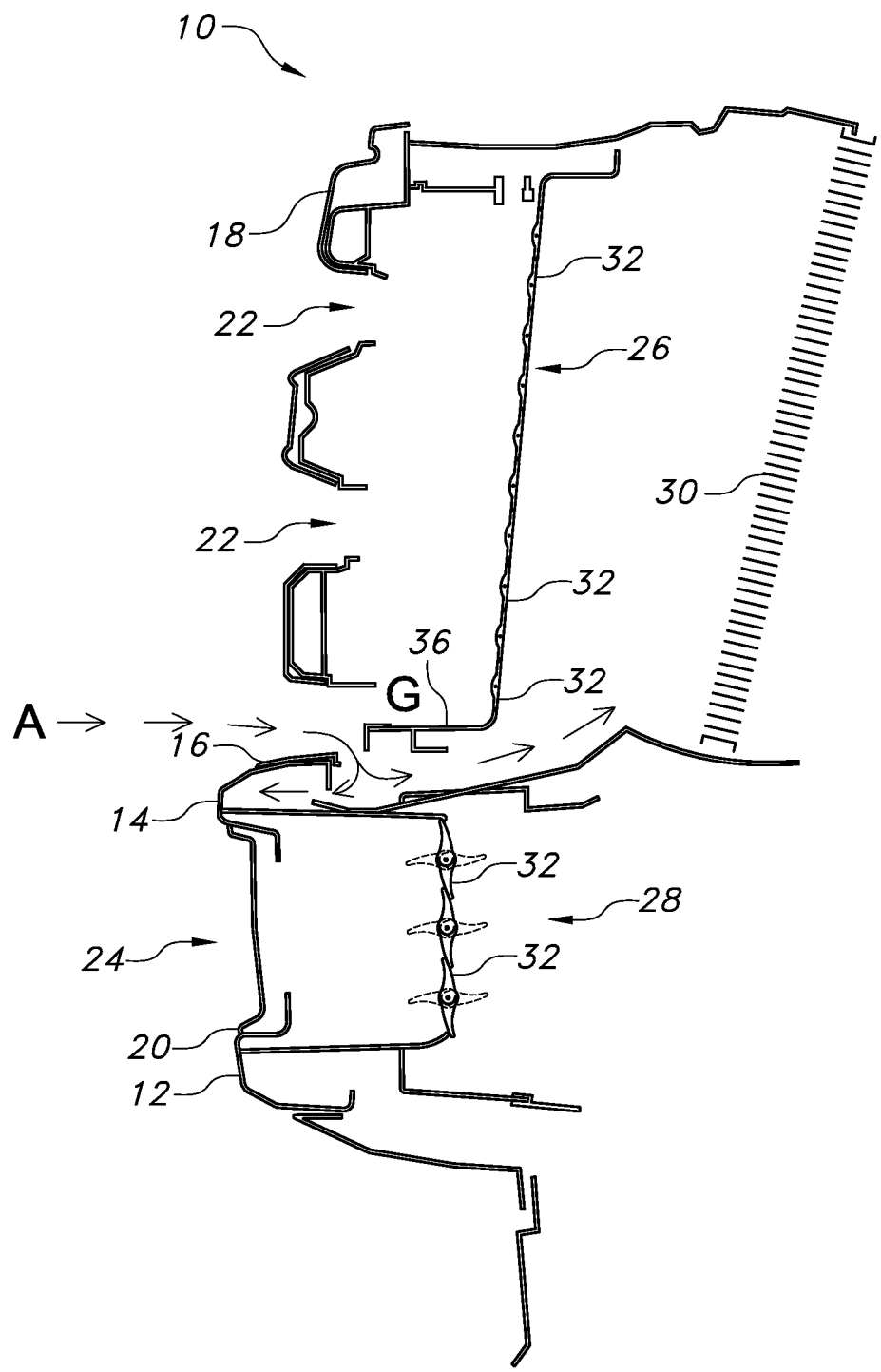
FIG. 2 depicts a side view of a vehicle including air flow patterns for a conventional front bumper step/step pad.

With reference to FIG. 2, the features of FIG. 1 are shown in side view. The depicted vehicle 10 further includes an upper grille shutter assembly 26 and a lower grille shutter assembly 28. As is known, such grille shutters are used to control an airflow passing through a grille assembly, for example to provide cooling air to a radiator 30 or to various underbody components such as the vehicle powertrain (not shown). In the depicted embodiment, the grille shutter assemblies 28, 30 are active grille shutter systems, including one or more vanes 32 that may be rotated between a fully open configuration (broken lines) and a fully closed configuration (solid lines) as needed in accordance with the amount of airflow desired. Of course, it will be appreciated that other grille shutters system types are contemplated.

Airflow through the upper grille portion 18 is shown by arrows A. As can be seen, in conventional systems airflow passes through a gap G between the bumper fascia 12 and elements of the vehicle body 10 such as the radiator mount 36. This "bumper-to-body" gap G is typically present in conventional industry designs, providing a 15 mm to 21 mm gap between the bumper fascia 12 and the upper grille portion 18/body-mounted grille to prevent inadvertent contact/rubbing therebetween. However, because of this gap, particularly when vanes 32 of the upper grille shutter system 26 are in a closed configuration as shown in FIG. 2, airflow leakage is observed. That is, when vanes 32 are closed, a portion of the airflow (arrows A) that would otherwise pass through is diverted into the structure of the bumper fascia 12.

Figure 3:
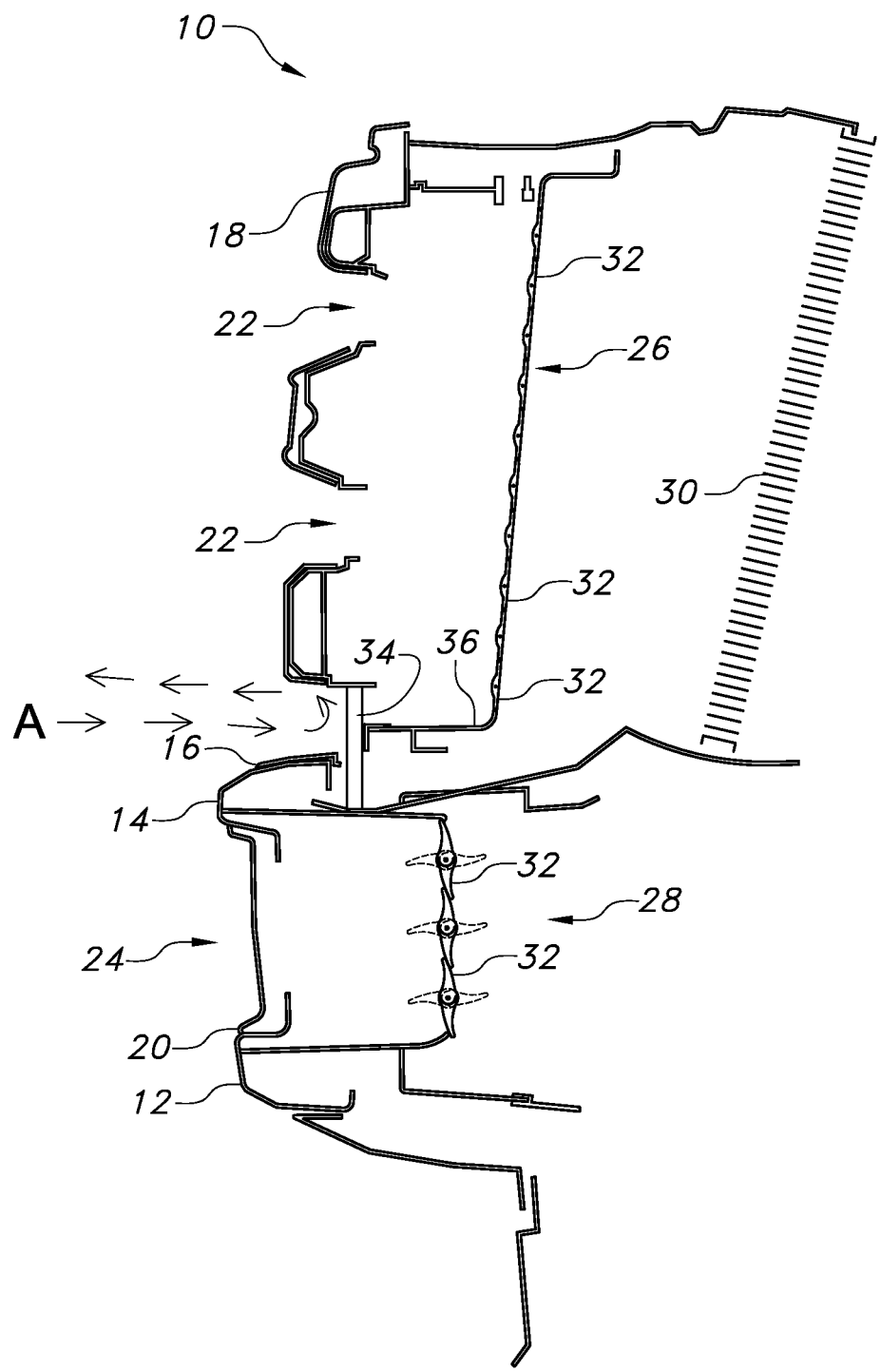
FIG. 3 depicts a side view of a vehicle including a gap seal according to the present disclosure and illustrating airflow patterns altered thereby.
Figure 4:
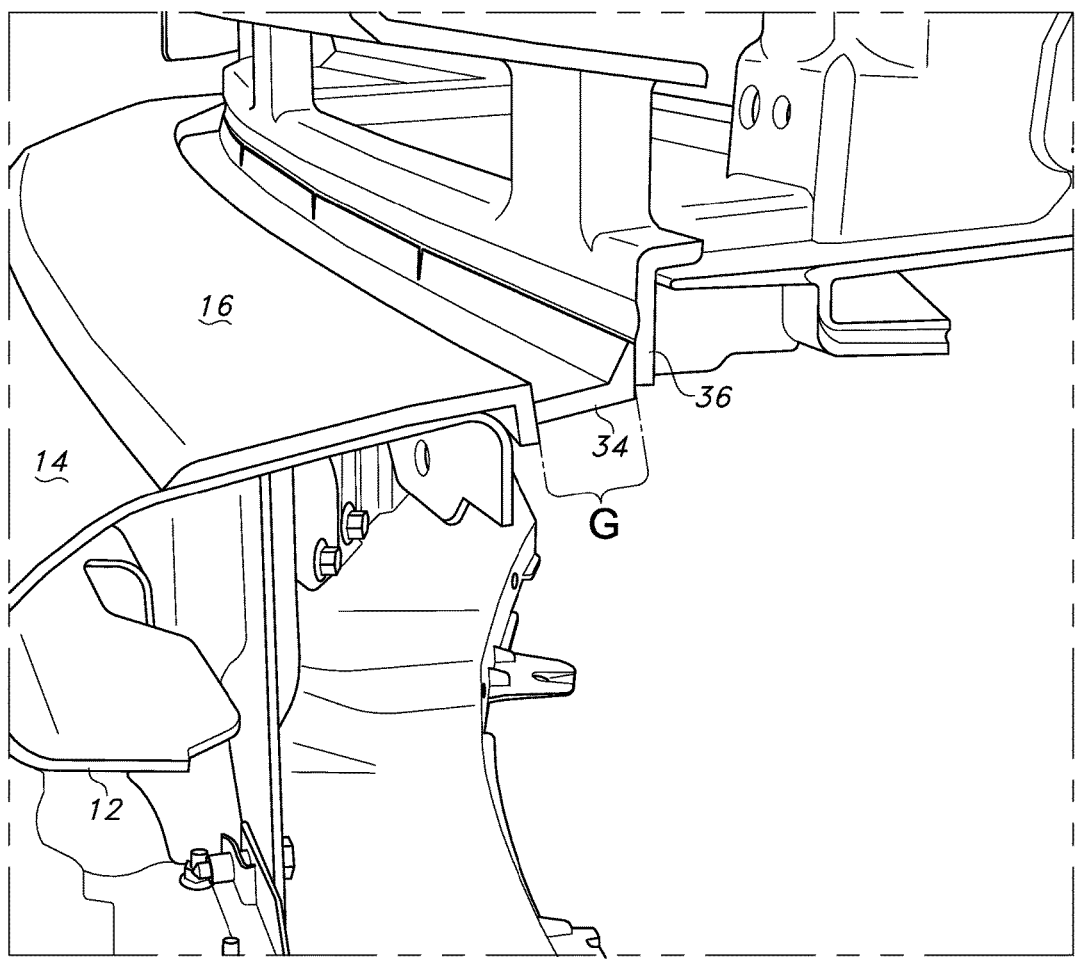
FIG. 4 illustrates an embodiment of a gap seal according to the present disclosure.

To solve this problem of aerodynamic drag, as shown in FIG. 3 a bumper to body gap seal 34 is provided between the front bumper step 14/bumper step pad 16, configured to seal gap G between the front bumper step 14 and the radiator mount 36. As shown in FIG. 4, seal 34 prevents the airflow leakage shown in FIG. 2, such as when vanes 32 of the upper grille shutter system 26 are in the closed configuration as shown in FIGS. 2 and 3. It has surprisingly been shown in wind tunnel testing that this seal 34 decreased cooling drag and provided an improvement in highway fuel economy.

In embodiments, the seal 34 is provided as a separate element from the bumper step pad 16 (see FIG. 3) configured to seal gap G. In alternative embodiments, the seal 34 is provided as an attachment to or an integral part of the bumper step pad 16 (see FIG. 4), configured to seal gap G. The seal 34 may be fabricated of a suitable flexible material, although use of more rigid materials is contemplated.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A front bumper step for a vehicle, comprising:
   a step portion having a step pad portion, wherein the step pad portion is fabricated of slip-resistant material; and
   a gap seal configured to prevent a flow of air through a gap defined between a front bumper fascia of the vehicle and a front grille assembly of the vehicle,
   wherein the gap seal is provided as an integral unit with the step pad portion.

2. A vehicle including the front bumper step of claim 1.

3. The front bumper step of claim 1, wherein the vehicle includes an active grille shutter system.

4. The front bumper step of claim 1, wherein the gap seal is fabricated of a flexible material.

5. The front bumper step of claim 1, wherein the front grille assembly is an upper grille assembly.

6. A front bumper and grille assembly for a vehicle, including a gap seal configured to prevent a flow of air through a gap defined between a front bumper fascia of the bumper and the grille assembly, wherein the gap seal is co-located with a step pad superimposed on a front bumper step element.

7. The assembly of claim 6, wherein the grille assembly is an upper grille assembly.

8. A vehicle including the assembly of claim 6.

9. The assembly of claim 6, wherein the gap seal and the step pad are an integral unit.

10. The assembly of claim 6, wherein the vehicle includes an active grille shutter system.

11. The assembly of claim 6, wherein the gap seal is fabricated of a flexible material.

12. A front bumper step pad for a vehicle, comprising:
    a step pad portion positioned on a front bumper fascia of the vehicle; and
    a gap seal portion configured to prevent a flow of air through a gap defined between the front bumper fascia of the vehicle and a front grille assembly of the vehicle, wherein the front grille assembly is an upper grille assembly.

13. The front bumper step pad of claim 12, wherein at least the gap seal portion is fabricated of a flexible material.

14. A vehicle including the front bumper step pad of claim 12.

15. The front bumper step pad of claim 12, wherein the gap seal portion and step pad portion are an integral unit.

16. The front bumper step pad of claim 12, wherein the vehicle includes an active grille shutter system.

* * * * *